United States Patent [19]

Hale et al.

[11] Patent Number: 5,002,451

[45] Date of Patent: Mar. 26, 1991

[54] WASTE MATERIAL DEBAGGING APPARATUS

[75] Inventors: John K. Hale; Jack W. Crane, both of New Holland; J. Keith Weinlader, Lancaster, all of Pa.

[73] Assignee: Ford New Holland, Inc., New Holland, Pa.

[21] Appl. No.: 456,705

[22] Filed: Dec. 26, 1989

[51] Int. Cl.[5] .......... B65G 65/34

[52] U.S. Cl. .......... 414/412; 222/166; 241/236; 241/285 A; 248/95

[58] Field of Search .......... 414/412; 294/104; 222/87, 166; 241/236, 285 A, 101 A; 24/30.5 R, 509, 510; 248/95, 101, 316.5

[56] References Cited

U.S. PATENT DOCUMENTS

| | | | |
|---|---|---|---|
| 1,916,531 | 7/1933 | Robb | 414/412 |
| 1,966,016 | 7/1934 | McCauley | 414/412 |
| 2,540,021 | 1/1951 | Wright | 241/236 X |
| 2,571,781 | 10/1951 | Sutch | 414/412 |
| 3,348,738 | 10/1967 | Hestlein | 414/412 X |
| 3,447,706 | 6/1969 | Moriarty | 414/412 |
| 3,476,341 | 11/1969 | Patterson | 248/95 |
| 3,482,718 | 12/1969 | Moriarty | 414/412 |
| 3,596,842 | 8/1971 | Barber | 414/412 X |
| 3,658,199 | 4/1972 | Owen, Jr. | 414/425 |
| 3,731,828 | 5/1973 | Clarke et al. | 414/412 |
| 4,252,489 | 2/1981 | Mechalas | 414/412 |
| 4,265,584 | 5/1981 | Duwell et al. | 414/412 |
| 4,310,955 | 1/1982 | David | 248/95 X |
| 4,487,007 | 12/1984 | Mullet et al. | 56/16.6 |
| 4,515,509 | 5/1985 | Frisz | 414/412 |
| 4,543,029 | 9/1985 | Grün et al. | 414/412 |
| 4,627,781 | 12/1986 | Borgner | 414/412 |
| 4,798,508 | 1/1989 | Lewis | 414/412 |

FOREIGN PATENT DOCUMENTS

| | | | |
|---|---|---|---|
| 605753 | 5/1978 | U.S.S.R. | 414/412 |
| 1090622 | 5/1984 | U.S.S.R. | 414/412 |

*Primary Examiner*—David A. Bucci
*Attorney, Agent, or Firm*—Darrell F. Marquette; Frank A. Seemar; Larry W. Miller

[57] ABSTRACT

A material debagging apparatus includes a receptacle movable between upright loading and inverted dumping positions. The receptacle defines a bagged material holding chamber with a closed bottom and an open top. A rupturing mechanism in the form of a pair of generally parallel drums having circumferential rows of teeth thereon is carried on the receptacle adjacent the closed bottom of the chamber. The rupturing mechanism is operable for rupturing a bag at least partially filled with material and disposed in the chamber with the bottom of the bag overlying the rupturing mechanism. A drive mechanism is coupled to the drums of the rupturing mechanism for transmitting rotary power thereto to cause counterrotation of the drums. A clamping device normally disposed in a clamping condition is mounted on the receptacle adjacent the open top of the chamber. The clamping device clamps and secures the top of the bag while the bottom of the bag is ruptured by the rupturing mechanism as the receptacle is moved from its loading to its dumping position thereby emptying the material from the ruptured bag.

24 Claims, 4 Drawing Sheets

WASTE MATERIAL DEBAGGING APPARATUS

BACKGROUND OF THE INVENTION

The present invention generally relates to collection and recycling of waste materials and, more particularly, to a debagging apparatus for separating waste material from plastic bags that are used in the collection of such material.

In many jurisdictions, legal restrictions have been recently passed prohibiting the dumping of earth grown materials into landfills. Therefore, waste material such as brush, leaves, tree trimmings, and grass clippings must be kept out of the main waste stream destined for landfills. This means that esarth grown materials have to be handled separately from the main waste stream. In some municipalities, leaves are collected at curbside and from streets by using vaccum and mechanical pickup machines before being transported to a recycling site. Tree trimmings and brush are handled at curbside, but separately from leaves, by feeding them into chipping and shredding machines which reduce them to small particles. These small particles are then loaded into trucks and transported to a recycling site.

Grass clippings are typically gathered from lawns and collected in plastic bags when lawns are mowed. Grass clippings amount to a sizable percentage of the main waste stream, especially during the summer months. Plastic bags of grass clippings are produced in relatively small quantities in many, widely-dispersed locations. For example, a single home may produce three or four bags of grass clippings each week. Currently, bagged grass clippings are picked up at curbside and then hauled to a compost processing site. At the processing site, the grass clippings must be emptied from the plastic bags before entering the processing equipment.

There is a pressing need for improving and semi-automating the collection of waste material such as bagged grass clippings and leaves in order to make recycling of waste material more efficient.

SUMMARY OF THE INVENTION

The present invention provides a waste material debagging apparatus designed to satisfy the aforementioned need. The term "waste material" is used generically and for purposes of convenience in referring to the debagging apparatus. One type of waste material advantageously handled by the debagging apparatus of the present invention is compostable earth grown material, such as grass clippings and leaves, that is gathered from lawns and collected in plastic bags. However, the debagging apparatus can also be used for handling plastic bags containing other types of waste material where emptying of the waste material from the plastic bags is desired.

The debagging apparatus of the present invention facilitates the use of a conventional refuse collection truck to transport waste material to an unloading location such as a compost processing site. The debagging apparatus is operable to cause waste material to be emptied from plastic bags as the waste material is loaded into the refuse collection truck. Therefore, the necessity of later separating the waste material from the plastic bags at the processing site is eliminated, and the plastic bags are prevented from becoming entangled in the compost processing equipment or mixed with the compostable material.

Accordingly, the present invention is directed to a material debagging apparatus which comprises: a receptacle movable between substantially upright loading and inverted dumping positions, the receptacle defining a chamber for holding bagged material; means for rupturing a bag disposed in the receptacle chamber and at least partially filled with material, the rupturing means being carried on the receptacle; and drive means for operating the rupturing means to cause rupturing of the bag. Also, the debagging apparatus includes means mounted on the receptacle for releasably clamping the bag in order to releasably secure the bag to the receptacle.

The rupturing means includes a pair of generally parallel rotatable members with a plurality of rupturing elements mounted on the rotatable members. The drive means is coupled to the rotatable members for causing counterrotation thereof. The rotatable members are drums with the rupturing elements on each rotatable drum being arranged in a plurality of circumferential rows spaced from one another axially along the drum. The spaced circumferential rows of rupturing elements on one drum are also staggered axially with respect to the circumferential rows of rupturing elements on the other drum.

The debagging apparatus further includes means for pivotally mounting the receptacle to a material receiving end of a refuse collection vehicle. The mounting means includes a support frae having first connection means capable of attachment to the material recieving end of the vehicle and second connection means capable of pivotally attaching the receptacle to the support frame. The mounting means also includes actuating means pivotally attached at one end to the support frame and at an opposite end to the receptacle. The actuating means is operable for causing pivotal movement of the receptacle between the loading and dumping positions.

These and other features and advantages of the present invention will become apparent to those skilled in the art upon a reading of the following detailed description when taken in conjunction with the drawings wherein the preferred embodiment of the invention is shown and described.

BRIEF DESCRIPTION OF THE DRAWINGS

In the following description, reference will be made to the drawings in which.

DESCRIPTION OF THE INVENTION

Figures 1, 2:
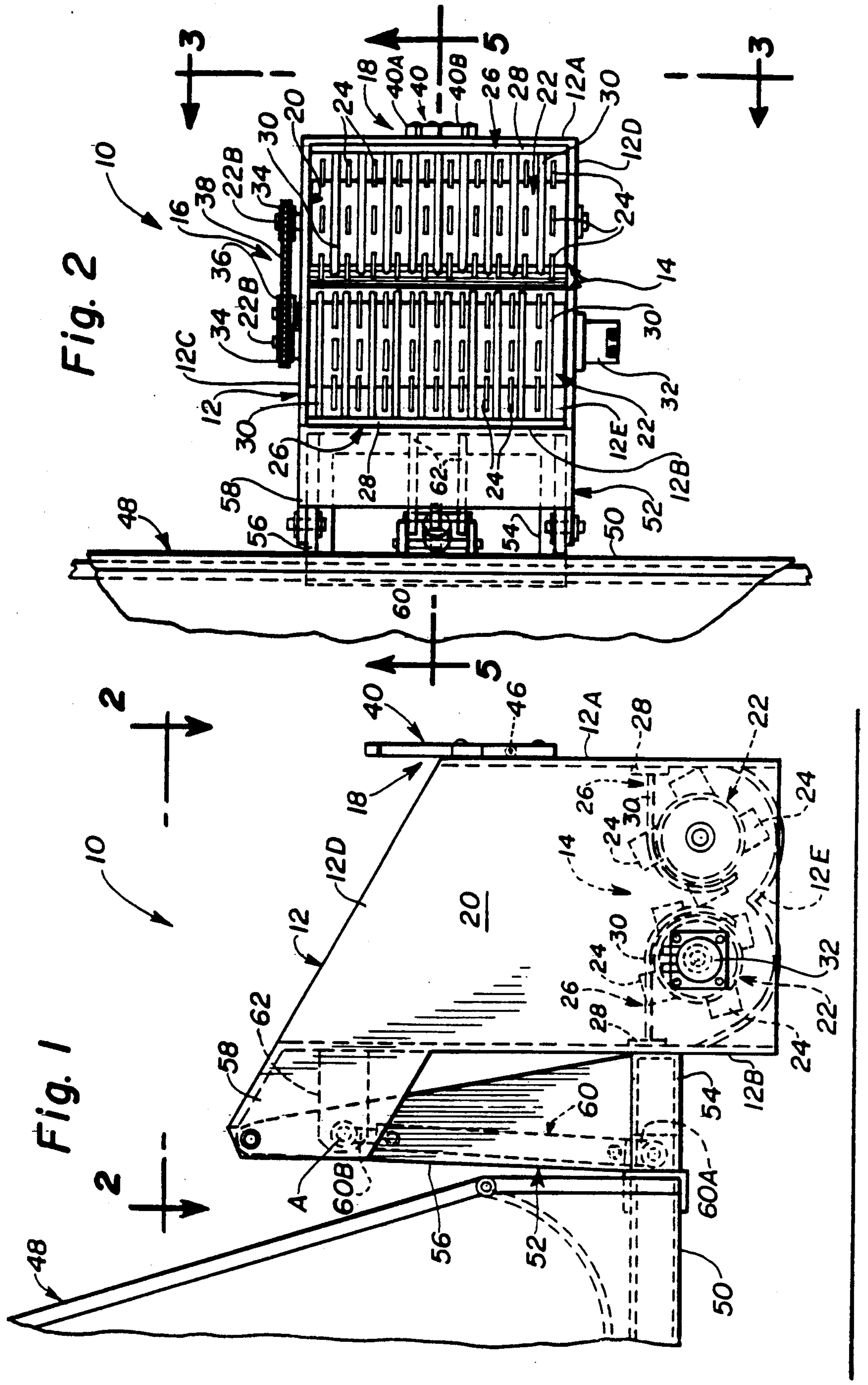
FIG. 1 is a left side elevational view of a waste material debagging apparatus of the present invention mounted on the rear of a conventional refuse collection truck.
FIG. 2 is a top plan view of the debagging apparatus as seen along line 2—2 in FIG. 1.

In the following description, terms such as "front" and "rear" would be determined by a person standing behind the debagging apparatus and facing in the direction of forward travel of the refuse collection truck. Also in the following description, it is to be understood that terms such as "rearwardly" and "upwardly" are words of convenience and are not to be construed as limiting terms.

Referring now to the drawings, and particularly to FIGS. 1–4, there is shown a waste material debagging apparatus of the present invention generally designated 10. Basically, the debagging apparatus 10 includes a receptacle 12, rupturing mechanism 14, drive mechanism 16, and a clamping device 18. The receptacle 12 defines a chamber 20 having a closed bottom and an open top. The rupturing mechanism 14 is carried on the receptacle 12 within the chamber 20 adjacent the closed bottom and below the open top of the chamber 20. The drive mechanism 16 transmits rotary power to the rupturing mechanism 14 to operate the same and cause rupturing of a bag B disposed in the receptacle 12 and at least partially filled with waste material. The clamping device 18 releasably clamps the top of the bag B in order to releasably secure the bag B to the receptacle 12.

More particularly, the receptacle 12 of the debagging apparatus 10 has a rectangular box-like shape and is composed of front and rear walls 12A, 12B rigidly interconnected by side walls 12C, 12D. The bottom of the receptacle 12 is closed by a bottom wall 12E rigidly interconnected to the front and rear walls 12A, 12B and side walls 12C, 12D. The top of the receptacle 12 is open to permit placing the bag B of waste material into the receptacle 12 as shown in dashed outline in FIG. 5. The rear wall 12B is greater in height than the front wall 12A and, as a result, the upper edges of the side walls 12C, 12D are inclined rearwardly and upwardly. From the above, it will be understood that the walls 12A–12E forming the receptacle 12 also define the chamber 20 therein having a closed bottom and an open top.

Figure 6:
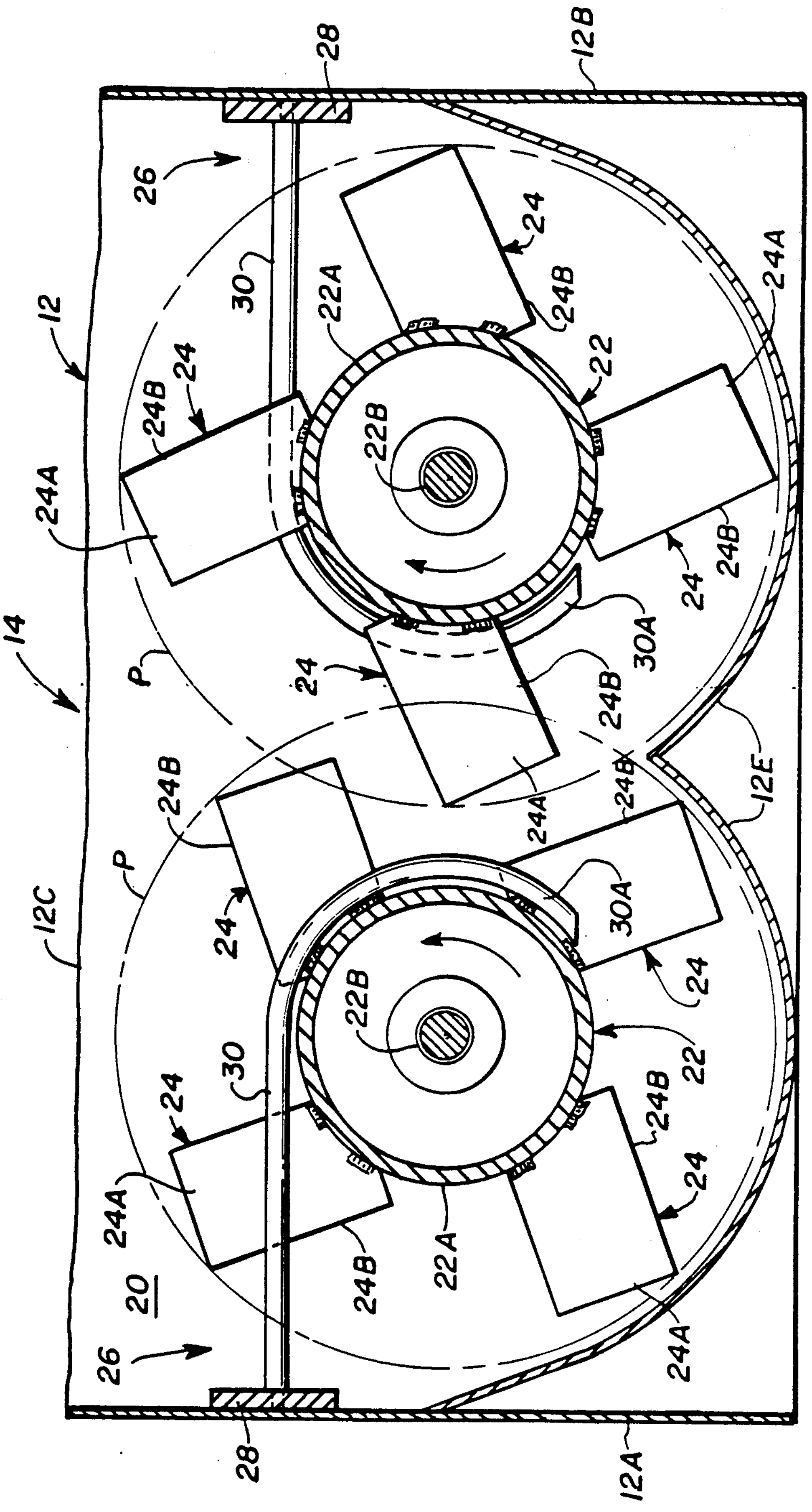
FIG. 6 is an enlarged view of a lower portion of the debagging apparatus seen in FIG. 5.

Referring to FIG. 6 and to FIGS. 1–4, the rupturing mechanism 14 of the debagging apparatus 10 includes a pair of rotatable members such as generally parallel drums 22 and a plurality of rupturing elments 24 in the form of teeth, knives, or blades mounted on each drum 22. The drums 22 each have a cylindrical hollow body 22A supported by a central shaft 22B. The shafts 22B are rotatably mounted at their opposite ends of the side walls 12C, 12D of the receptacle 12. The teeth 24 are rigidly mounted on the outer surfaces of the cylindrical hollow bodies 22A of the drums 22. The teeth 24 on each rotatable drum 22 are disposed in a plurality of circumferential rows spaced from one another axially along the drum 22. Each of the rows of teeth 24 consists of one or more individual teeth as desired. As shown in FIG. 2, the spaced circumferential rows of teeth 24 on the drum 22 are staggered axially with respect to the circumferential rows of teeth 24 on the other drum 22.

Figure 5:
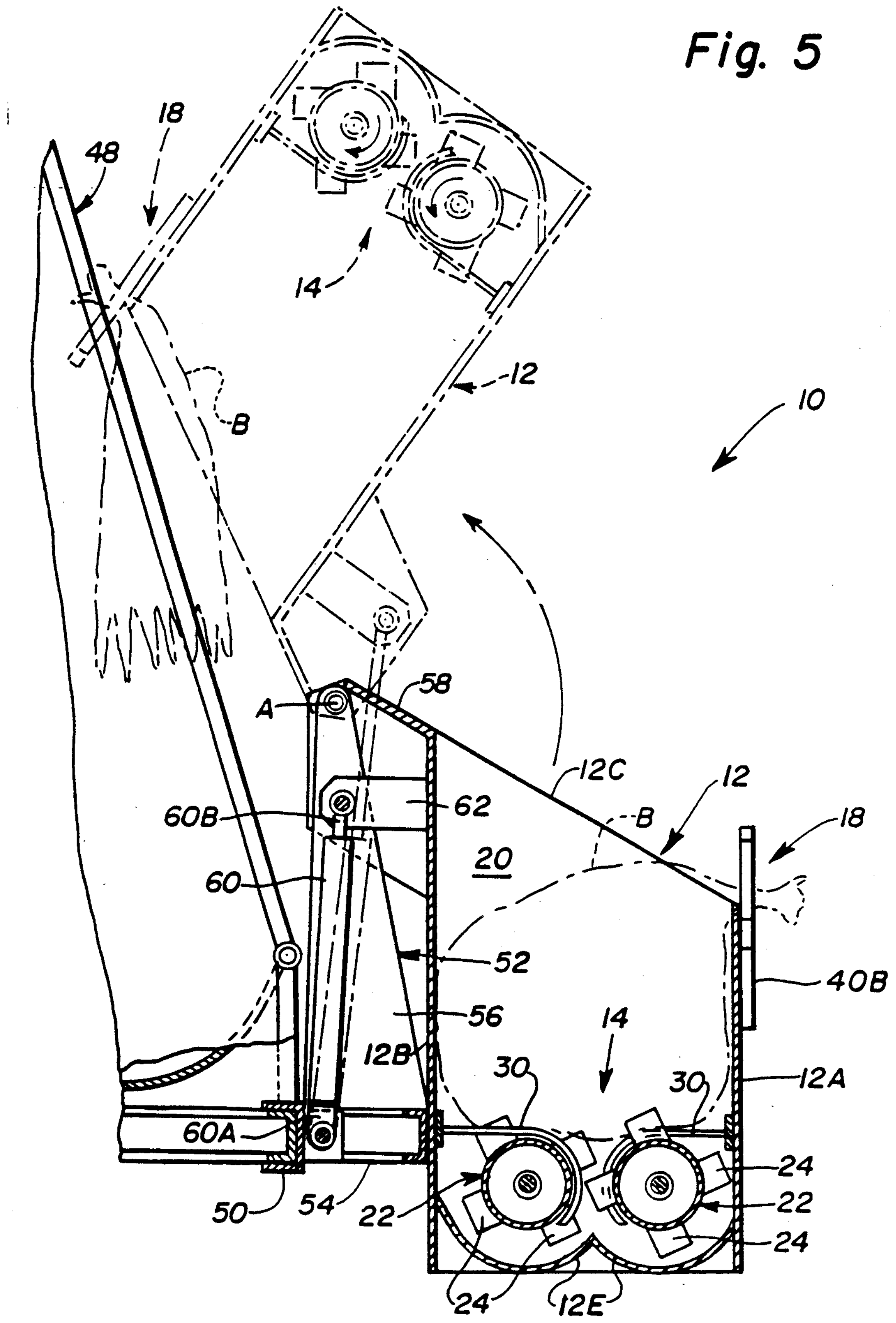
FIG. 5 is a longitudinal sectional view of the debagging apparatus taken along line 5—5 in FIG. 2.

The rupturing mechanism 14 also includes a pair of grate-like structures 26 upon which the bag B of waste material rests as seen in FIG. 5. Each grate-like structure 26 includes a flat end plate 28 and a plurality of laterally spaced, generally parallel cylindrical bars 30. The end plates 28 are attached respectively to the front and rear walls 12A, 12B of the receptacle 12. The parallel bars 30 of each structure 26 are rigidly attached at their inner ends to the end plate 28 and extend therefrom to their outer ends 30A which are curved downwardly and around a portion of the respective drum 22 associated with the particular grate-like structure 26. The parallel bars 30 are disposed above the respective drums 22 and extend between the rows of teeth 24.

As seen in FIG. 5, the bars 30 support the bag B above the drums 22. The drums 22 are counterrotated in the directions of the arrows in FIG. 6 such that outer ends 24A of the teeth 24 follow circular paths of travel P in which they project above the bars 30 and engage the bottom of the bag B as it is resting on the bars 30 before moving away from each other. The teeth 24 have leading edges 24B which are offset relative to a radius through the drums 22. The leading edges 24B of the teeth 24 are also disposed substantially tangential to the outer surface of the associated drum 22. This orientation of the teeth 24 and their opposite directions of travel as they project above the bars 30 following paths P results in an effective ripping and tearing action on the bag bottom to thus rupture the bag B. The parallel bars 30, in addition to supporting the bag B, serve to strip and release the bag B from the teeth 24 as the latter pass below the bars 30 thereby preventing the ruptured bag B from becoming wrapped about the drums 22.

Figure 4:
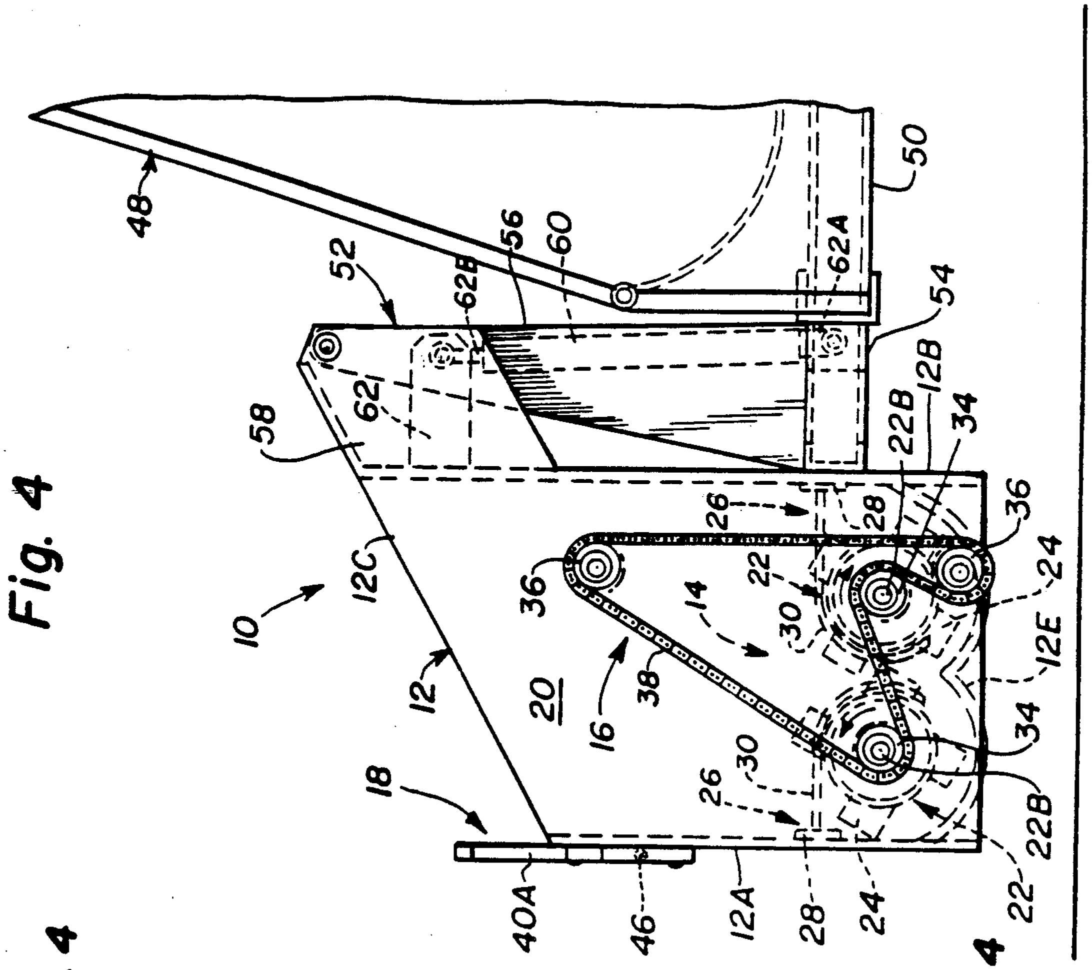
FIG. 4 is a right side elevational view of the debagging apparatus as seen along line 4—4 in FIG. 3.
Figure 3:
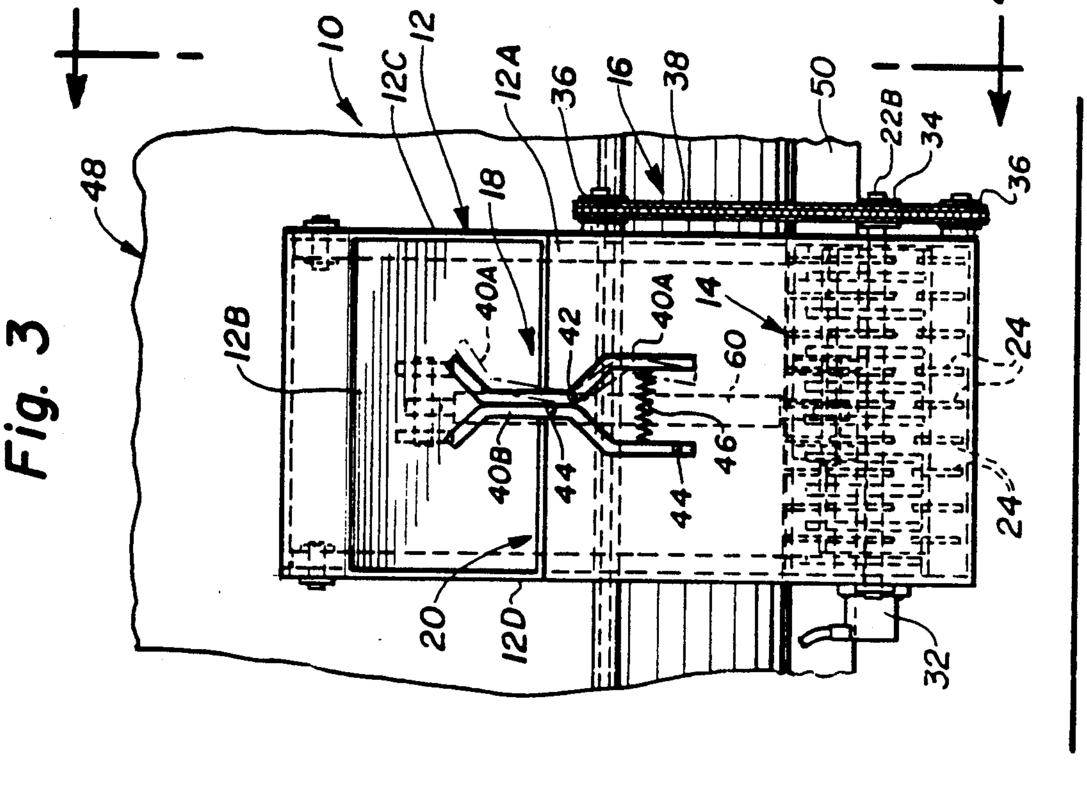
FIG. 3 is a rear elevational view of the debagging apparatus as seen along line 3—3 in FIG. 2.

The drive mechanism 16 of the debagging apparatus 10 is coupled to the central shafts 22B of the rotatable drums 22 for counterrotatably driving them relative to one another. The drive mechanism 16 includes a source of rotary power in the form of a hydraulic motor 32 mounted on the exterior of the side wall 12D of the receptacle 12 and drivingly coupled to the end of the central shaft 22B of the rearward drum 22. The drive mechanism 16 further includes a pair of drive sprockets 34 mounted on the ends of the central shafts 22B of drums 22 at the exterior of the side wall 12C of the receptacle 12, a pair of idler sprockets 36 rotatably mounted on the exterior of the receptacle side wall 12C, and an endless drive chain 38 entrained about the drive and idler sprockets 34, 36. As seen in FIG. 4, the drive chain 38 is wrapped about the drive sprockets 34 in opposite directions for producing counterrotation of the drums 22 when the hydraulic motor 32 is operating to supply rotary power.

The clamping device 18 of the debagging apparatus 10 includes a pair of elongated clamp members 40A, 40B positioned side-by-side and normally disposed in a clamping condition for clamping and securing a gathered top end portion of the bag B as seen in FIG. 5. Clamp member 40A is pivotally attached to the front wall 12A of the receptacle 12 by a fastener 42 located a short distance below the upper edge of the front wall 12A. The other clamp member 40B is immovably attached to the receptacle front wall 12A by a pair of fasteners 44. Further, a yieldable element in the form of a spring 46 is located between lower spaced apart portions of the clamp members 40A, 40B for biasing the clamp members 40 to normally assume a closed, clamping condition seen in solid lines in FIG. 3. However, the spring 46 is yieldably compressible to permit clamp member 40A to pivotally move clockwise about fastener 42 away from clamp member 40B at the upper portions of the clamp members 40A, 40B (as seen in dashed outline in FIG. 3) toward an opened, nonclamping condition. The upper ends of the members 40A, 40B together form a V-shaped configuration which facilitates insertion of the gathered top end portion of the bag B between the clamp members 40A, 40B.

Preferably, the receptacle 12 of the debagging apparatus 10 is supported from a waste material receiving rear end 48 of a conventional refuse collection vehicle.

For this purpose, the apparatus 10 includes means for pivotally mounting the receptacle 12 to a platform 50 of the refuse collection vehicle.

The mounting means includes a support frame 52 having a horizontal U-shaped bottom portion 54 which provides a first connection structure for attachment to the platform 50 of the vehicle. The support frame 52 also includes a pair of spaced upright brackets 56 rigidly mounted on the bottom portion 54 providing a second connection structure for pivotal attachment of a pair of brackets 8 on the rear wall 12B of the receptacle 12 to the support frame 52. The receptacle 12 is thereby pivotally movable relative to the support frame 52 about a horizontal axis A located overhead and spaced rearwardly of the receptacle 12.

The mounting means also includes an actuating device 60 in the form of a hydraulic cylinder which is pivotally attached at its cylinder end 60A to the support frame bottom portion 54 and at its piston rod end 60B to a pair of tabs 62 fixed on and extending from the rear wall 12B of the receptacle 12. The hydralic cylinder 60 is operable by extension and retraction of the piston rod thereof to cause pivotal movement of the receptacle 12 relative to the support frame 52 between a lower upright loading position and an upper inverted dumping position as seen in FIG. 5.

In summary, the rupturing mechanism 14 is operable for rupturing a bag B at least partially filled with waste material and disposed in the receptacle chamber 20 with the bottom of the bag B overlying the rupturing mechanism 14. The drive mechanism 16 mounted on the receptacle 12 counterrotatably drives the drums 22 of the rupturing mechanism 14 to cause ripping and tearing of the bag B by the teeth 24. The clamping device 18 clamps and secures gathered top end portions of the bag B while the bag B is ruptured by the rupturing mechanism 14 as the receptacle 12 is moved from its lower upright loading position, shown in solid lines in FIG. 5, to its upper inverted dumping position, shown in dashed lines in FIG. 5. Such clamping and securing of the bag B by the clamping device 18 ensures emptying of the waste material from the ruptured bag B into the refuse collection truck.

Although the rupturing mechanism 14 described above includes a pair of rotatable members of drums 22, it will be understood that the rupturing mechanism 14 could alternatively include only one rotatable member or drum.

What is claimed is:

1. A material debagging apparatus, comprising:
- a receptacle defining a chamber for holding bagged material;
- means for rupturing a bag disposed in said chamber and at least partially filled with mterial, said rupturing means being carried on said receptacle;
- drive means for operating said rupturing means to cause rupturing of the bag; and
- means mounted on said receptacle for releasably clamping the bag in order to releasably secure the bag to said receptacle.

2. The apparatus as recited in claim 1, wherein said rupturing means includes a pair of generally parallel rotatable members with a plurality of rupturing elements mounted on said rotatable members.

3. The apparatus as recited in claim 2, wherein said drive means is coupled to said rotatable members for causing counterrotation of said rotatable members.

4. The apparatus as recited in claim 2, wherein said rupturing elements on each of said rotatable members are disposed in a plurality of circumferential rows spaced from one another axially along each of said rotatable members.

5. The apparatus as recited in claim 4, wherein said spaced circumferential rows of rupturing elements on one of said rotatable members are staggered axially with respect to said circumferential rows of rupturing elements on the other one of said rotatable members.

6. The apparatus as recited in claim 1, further comprising:
- means for pivotally mounting said receptacle to a material receiving end of a transporting vehicle.

7. The apparatus as recited in claim 6, wherein said mounting means includes:
- a support frame having first connection means for attachment to the material receiving end of the vehicle and second connection means for pivotally attaching said receptacle to said support frame; and
- actuating means pivotally attached at one end to said support frame and at an opposite end to said receptacle and being operable for causing pivotal movement of said receptacle relative to said support frame between loading and dumping positions.

8. The apparatus as recited in claim 1, wherein said chamber has a closed bottom and an open top, and wherein said rupturing means is disposed within said chamber adjacent said closed bottom and below said open top.

9. The apparatus as recited in claim 2, wherein said rupturing elements each have a leading edge which is offset relative to a radius through the rotatable member on which said rupturing elements are mounted.

10. The apparatus as recited in claim 1, wherein said rupturing mechanism includes at least one rotatable member with a plurality of rupturing elements mounted thereon.

11. A material debagging apparatus, comprising:
- a receptacle pivotally movable between a substantially upright loading position and an inverted dumping position, said receptacle defining a chamber for holding bagged material;
- means for rupturing a bag disposed in said chamber and at least partially filled with material, said rupturing means being carried on said receptacle, said rupturing means including a pair of generally parallel rotatable members with a plurality of rupturing teeth mounted thereon and movable in circular paths of travel upon rotation of said rotatable members;
- drive means coupled to said rotatable members of said rupturing means for transmitting rotary power thereto and being operable to rotate said rotatable members for causing rupturing of the bag by said teeth; and
- means mounted on said receptacle for releasably clamping the bag in order to releasably secure the bag to said receptacle.

12. The apparatus as recited in claim 11, wherein said drive means is coupled to said rotatable members for causing counterrotation of said rotatable members.

13. The apparatus as recited in claim 12, wherein said rotatable members are counterrotated by said drive means such that said rupturing teeth on one rotatable member move away from said rupturing teeth on the other rotatable member at the upper portions of their circular paths of travel.

14. The apparatus as recited in claim 11, wherein said teeth on each rotatable member are disposed in a plurality of circumferential rows spaced from one another axially along each rotatable member.

15. The apparatus as recited in claim 14, wherein said axially spaced circumferential rows of rupturing teeth on one of said rotatable members are staggered axially with respect to said circumferential rows of rupturing teeth on the other one of said rotatable members.

16. The apparatus as recited in claim 11, further comprising:

means for pivotally mounting said receptacle to a material receiving end of a transporting vehicle.

17. The apparatus as recited in claim 16, wherein said mounting means includes:

a support frame having first connection means for attachment to the material receiving end of the vehicle and second connection means for pivotally attaching said receptacle to said support frame; and actuating means pivotally attached at one end to said support frame and at an opposite end to said receptacle and being operable for causing pivotal movement of said receptacle relative to said support frame between said loading and dumping positions.

18. In combination with a refuse collection vehicle having a waste material receiving end, a waste material debagging apparatus, comprising:

a receptacle defining a chamber for holding bagged material;

means for rupturing a bag disposed in said chamber and at least partially filled with material, said rupturing means being carried on said receptacle, said rupturing means including a pair of generally parallel rotatable members with a plurality of rupturing elements mounted on said rotatable members;

drive means coupled to said rotatable members of said rupturing means for transmitting rotary power thereto and being operable to rotate said rotatable members for causing rupturing of the bag by said rupturing elements; and means for pivotaly mounting said receptacle to said waste material receiving end of said vehicle, said mounting means including a support frame attached to said vehicle receiving end, said support frame and said receptacle having respective brackets pivotally connected together so as to mount said receptacle for pivotal movement relative to said support frame between a generally upright loading position in which said receptacle is located rearwardly of said waste material receiving end and a generally inverted dumping position in which said receptacle is located above said waste material receiving end.

19. The apparatus as recited in claim 18, wherein said mounting means also includes actuating means pivotally attached at one end to said support frame and at an opposite end to said receptacle and being operable for causing pivotal movement of said receptacle relative to said support frame between said upright loading and inverted dumping positions.

20. The apparatus as recited in claim 18, further comprising:

means mounted on said receptacle for releasably clamping the bag in order to releasably secure the bag to said receptacle.

21. The apparatus as recited in claim 18, wherein said drive means is coupled to said rotatable members for causing counterrotation of said rotatable members.

22. The apparatus as recited in claim 18, wherein said rupturing elements on each rotatable member are disposed in a plurality of circumferential rows spaced from one another axially along each rotatable member.

23. The apparatus as recited in claim 22, wherein said spaced circumferential rows of rupturing elements on one of said rotatable members are staggered axially with respect to said circumferential rows of rupturing elements on the other one of said rotatable members.

24. A material debagging apparatus, comprising:

a receptacle movable between loading and dumping positions, said receptacle defining a chamber for holding bagged material;

means for rupturing a bag disposed in said chamber and at least partially filler with material, said rupturing means being carried on said receptacle;

drive means for operating said rupturing means to cause rupturing of the bag;

a support frame having first connection means for attachment to a material receiving end of a transporting vehicle and second connection means for pivotally attaching said receptacle to said support frame; and actuating means pivotally attached at one end to said support frame and at an opposite end to said receptacle and being operable for causing pivotal movement of said receptacle relative to said support frame between said loading and dumping positions.

* * * * *